United States Patent
Pularikkal et al.

(10) Patent No.: US 11,202,288 B2
(45) Date of Patent: Dec. 14, 2021

(54) FORMING CHANNEL DEVICE GROUPS WITHIN A CITIZENS BROADBAND RADIO SERVICE BAND

(71) Applicant: Cisco Technology, Inc., San Jose, CA (US)

(72) Inventors: Gangadharan Byju Pularikkal, San Jose, CA (US); Santosh Ramrao Patil, Santa Clara, CA (US); Raghavaiah Avula, Milpitas, CA (US); Akramsheriff Ismailsheriff, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 80 days.

(21) Appl. No.: 16/562,822

(22) Filed: Sep. 6, 2019

(65) Prior Publication Data
US 2021/0076378 A1    Mar. 11, 2021

(51) Int. Cl.
*H04W 72/04* (2009.01)
*H04W 16/14* (2009.01)
(Continued)

(52) U.S. Cl.
CPC ....... *H04W 72/0453* (2013.01); *H04W 16/14* (2013.01); *H04W 28/0268* (2013.01);
(Continued)

(58) Field of Classification Search
CPC ......... H04W 72/0453; H04W 28/0268; H04W 72/14; H04W 72/121; H04W 72/085; H04W 16/14
See application file for complete search history.

(56) References Cited

U.S. PATENT DOCUMENTS 10,004,031 B2   6/2018   Seok
10,271,351 B1   4/2019   Wang
(Continued)

FOREIGN PATENT DOCUMENTS

WO    2018175639 A1    9/2018

OTHER PUBLICATIONS

International Search Report and Written Opinion from the International Searching Authority, dated Oct. 26, 2020, 12 pages, for corresponding International Patent Application No. PCT/US2020/048238.

(Continued)

*Primary Examiner* — Omar J Ghowrwal
(74) *Attorney, Agent, or Firm* — Polsinelli PC

(57) ABSTRACT

Systems, methods, and computer-readable media for dynamically assigning devices to specific channels in the CBRS band. One or more dedicated channels within the CBRS band can be selected and a boost channel device group can be formed by exclusively allocating the one or more dedicated channel to the boost channel device group. Further, a normal channel device group can be formed by allocating, to the normal channel device group, one or more channels in the CBRS band that are separate from the one or more dedicated channels allocated to the boost channel device group. One or more devices communicating in the CBRS band can be selectively assigned to either the boost channel device group or the normal channel device group to selectively control communications in the CBRS band over the one or more dedicated channels utilized by the boost channel device group.

20 Claims, 8 Drawing Sheets

(51) Int. Cl.
*H04W 28/02* (2009.01)
*H04W 72/08* (2009.01)
*H04W 72/12* (2009.01)
*H04W 72/14* (2009.01)

(52) U.S. Cl.
CPC ....... *H04W 72/085* (2013.01); *H04W 72/121* (2013.01); *H04W 72/14* (2013.01)

(56) References Cited

U.S. PATENT DOCUMENTS

| | | |
|---|---|---|
| 2017/0086224 A1* | 3/2017 | Wilhelmsson ........ H04W 52/34 |
| 2018/0035301 A1 | 1/2018 | Nama et al. |
| 2018/0049055 A1* | 2/2018 | Wiberg ............... H04W 72/044 |
| 2019/0124665 A1 | 4/2019 | Singh |
| 2019/0150134 A1 | 5/2019 | Kakinada et al. |
| 2020/0028561 A1* | 1/2020 | Leulescu ............. H04B 7/0691 |
| 2021/0068025 A1* | 3/2021 | Shukla .................. H04W 28/08 |

OTHER PUBLICATIONS

Riggio, Roberto, et al., "Interference and traffic aware channel assignment in WiFi-based wireless mesh networks," citeseerx.ist.psu.edu, Sep. 2010, pp. 1-12.

Ying, Xuhang, et al., "SAS-Assisted Coexistence-Aware Dynamic Channel Assignment in CBRS Band," arxiv.org, Jul. 18, 2018, pp. 1-13.

* cited by examiner

FORMING CHANNEL DEVICE GROUPS WITHIN A CITIZENS BROADBAND RADIO SERVICE BAND

TECHNICAL FIELD

The present technology pertains to dynamically assigning devices to specific channels in the CBRS band, and in particular to dynamically assigning devices to a boost channel device group for communicating in the CBRS band over one or more dedicated channels exclusively allocated to the boost channel device group.

BACKGROUND

The Citizens Broadband Radio Service (CBRS) band is beginning to be adopted for commercial use in providing network services. For example, infrastructure devices and platforms are currently available for wirelessly providing network services through the CBRS band. Further, the CBRS band might be utilized in 5G deployments. A CBRS network deployment can include a set of CBRS devices under the same administrative domain. The deployment can have a common interface management policy such as a centralized or distributed self-organizing network (SON) policy that includes a group id of the set of CBRS devices. A spectrum access system can allocate available space in the CBRS band, e.g. general authorized access (GAA) spectrum space, to the CBRS devices under the same group without any channel orthogonalization. However the bandwidth of the available space in the CBRS band may not support a distribution of frequencies to increase or otherwise optimize the carrier aggregation capabilities for all of the CBRS devices. There therefore exist needs for systems, methods, and computer-readable media for dynamically increasing, also referred to as boosting, of the CBRS devices by dynamically allocating additional component carriers to the CBRS devices. Specifically, there exist needs for systems, methods, and computer-readable media for selectively allocating additional component carriers to the CBRS devices by dynamically assigning specific channels in the CBRS spectrum to the CBRS devices.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
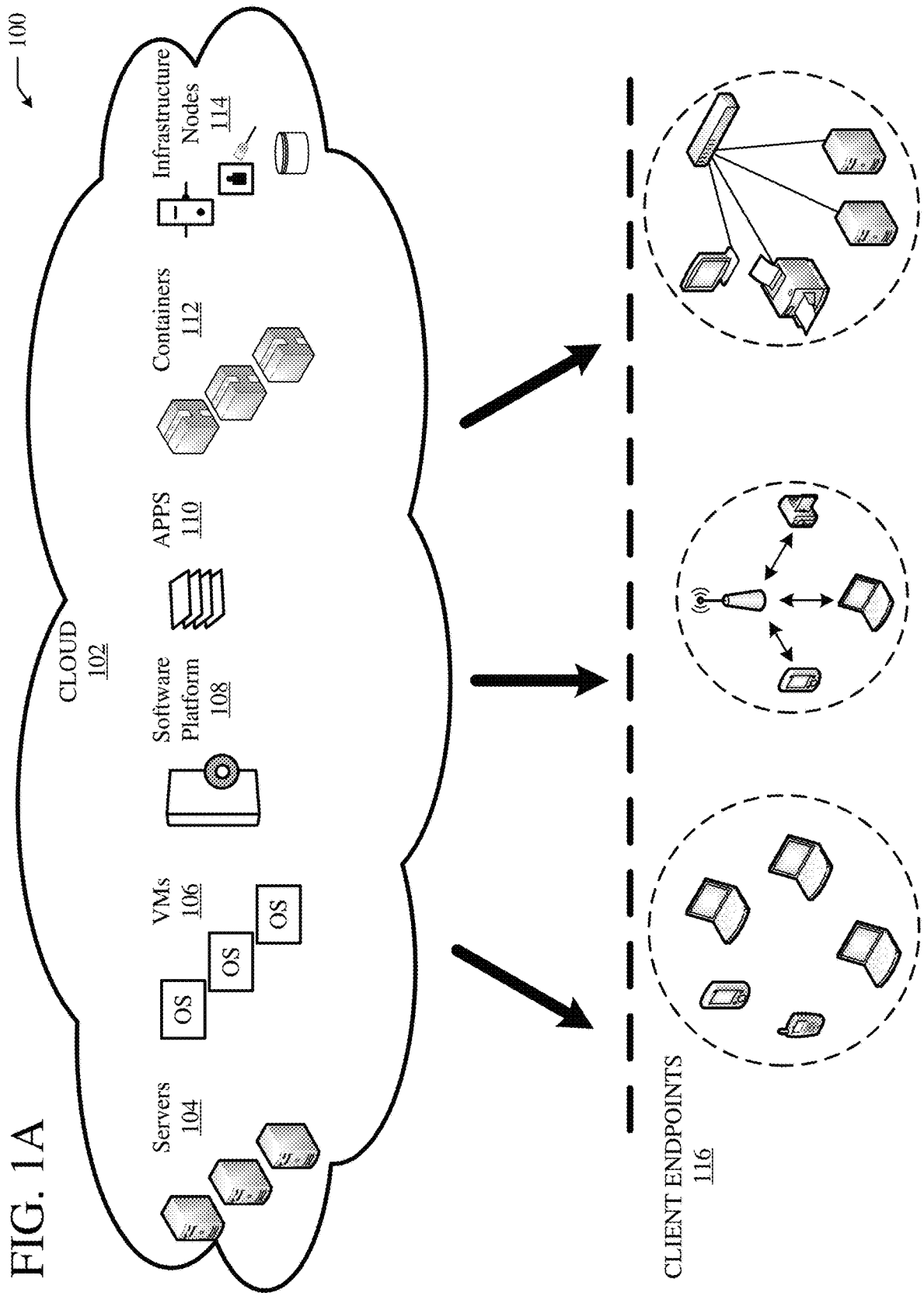
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include selecting one or more dedicated channels within the CBRS band. A boost channel device group can be formed by exclusively allocating the one or more dedicated channels to the boost channel device group. Further, a normal channel device group can be formed by allocating, to the normal channel device group, one or more channels in the CBRS band that are separate from the one or more dedicated channels allocated to the boost channel device group. One or more devices communicating in the CBRS band can be selectively assigned to either the boost channel device group or the normal channel device group. Specifically, the one or more device can be selectively assigned to either the boost channel device group or the normal channel device group to selectively control communications in the CBRS band over the one or more dedicated channels utilized by the boost channel device group.

A system can include one or more processors and at least one computer-readable storage medium storing instructions which, when executed by the one or more processors, cause the one or more processors to select one or more dedicated channels within the CBRS band. The instructions can also cause the one or more processors to form a boost channel device group by exclusively allocations the one or more dedicated channels to the boost channel device group. Further, the instructions can cause the one or more processors to form a normal channel device group by allocating, to the normal channel device group, one or more channels in the CBRS band that are separate from the one or more dedicated channels allocated to the boost channel device group. Additionally, the instructions can cause the one or more processors to selectively assign one or more devices communicating in the CBRS band, including Long-Term Evolution (LTE) small cell access points, to either the boost channel device group or the normal channel device group. By selectively assigning the one or more devices to either the boost channel device group or the normal channel device group, the instructions can cause the one or more processors to selectively control communications in the CBRS band over the one or more dedicated channels.

A non-transitory computer-readable storage medium having stored therein instructions which, when executed by a processor, cause the processor to select one or more dedicated channels within the CBRS band. The instructions can also cause the processor to form a boost channel device group by exclusively allocating the one or more dedicated channels to the boost channel device group. Further, the instructions can cause the processor to form a normal channel device group by allocating, to the normal channel device group, one or more channels in the CBRS band that are separate from the one or more dedicated channels allocated to the boost channel device group. The one or more channels in the CBRS band allocated to the normal channel device group can include all channels in the CBRS band that are not allocated to the boost channel device group. The instructions can also cause the processor to selectively assign one or more devices communicating in the CBRS band to either the boost channel device group or the normal channel device group. By selectively assigning the one or more devices to either the boost channel device group or the normal channel device group, the instructions can cause the processor to selectively control communications in the CBRS band over the one or more dedicated channels.

DESCRIPTION

The disclosed technology addresses the need in the art for mechanisms for increasing throughput of CBRS devices operating in the CBRS band. In particular, the disclosed technology addresses the need in the art for mechanisms for increasing carrier aggregation capabilities for CBRS devices operating in the CBRS band. The present technology involves system, methods, and computer-readable media for dynamically assigning devices to specific channels in the Citizens Broadband Radio Services CBRS band. Further, the present technology involves systems, methods, and computer-readable media for dynamically assigning devices to a boost channel device group for communicating in the CBRS band over one or more dedicated channels exclusively allocated to the boost channel device group.

Figure 1B:
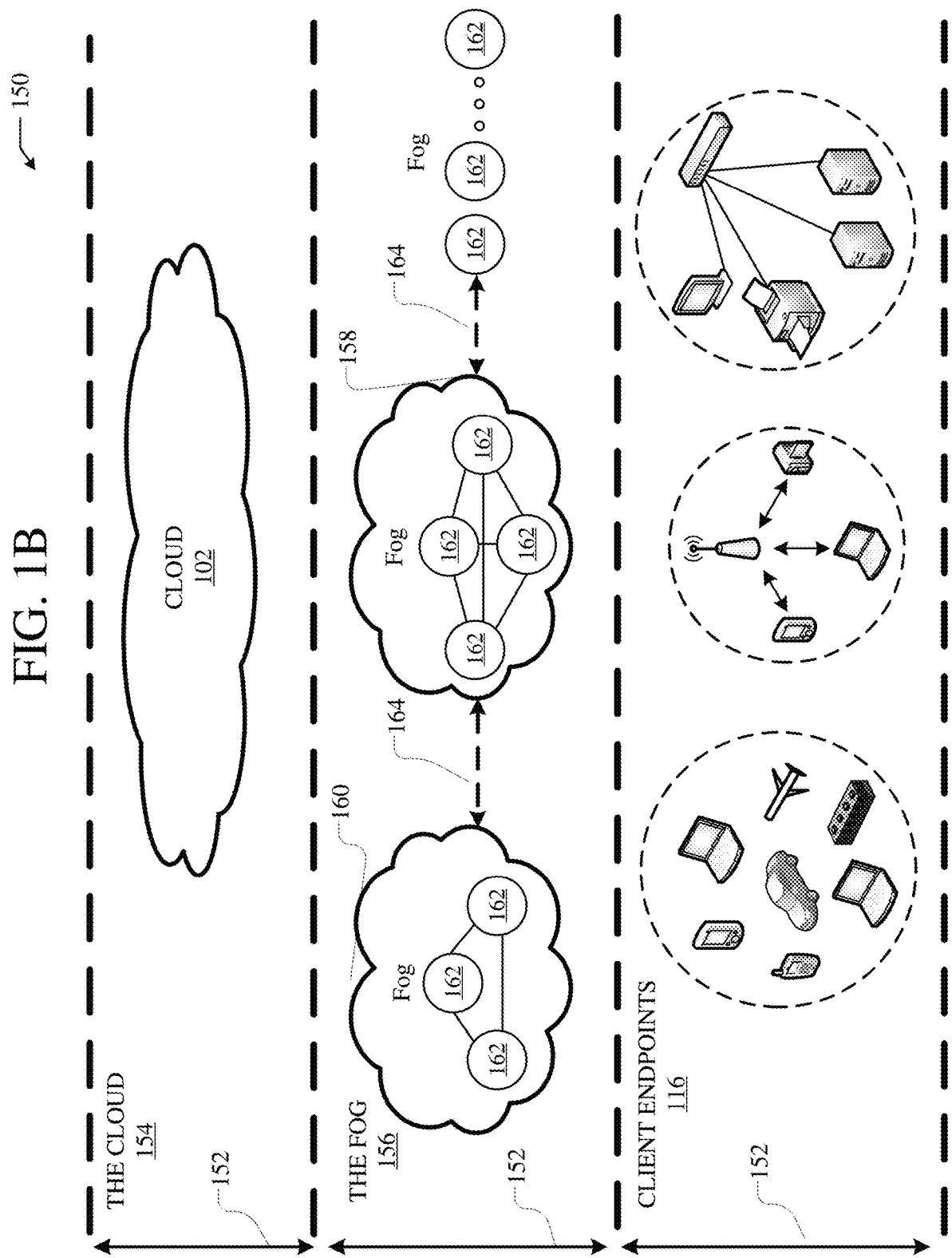
FIG. 1B illustrates an example fog computing architecture.
Figure 6:
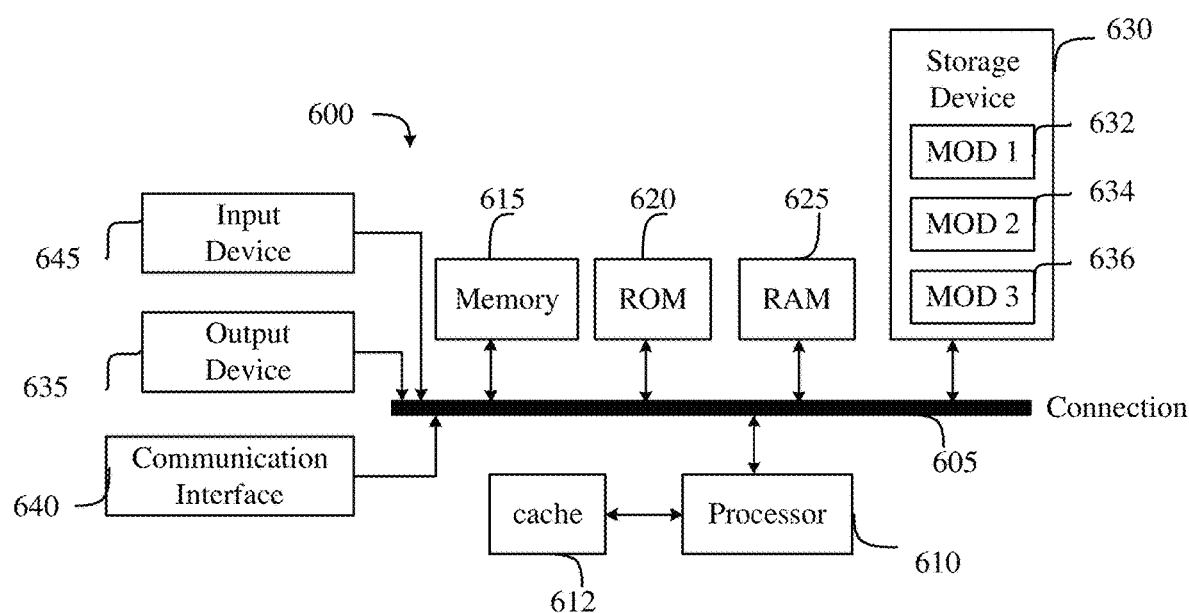
FIG. 6 illustrates an example computing system.
Figure 7:
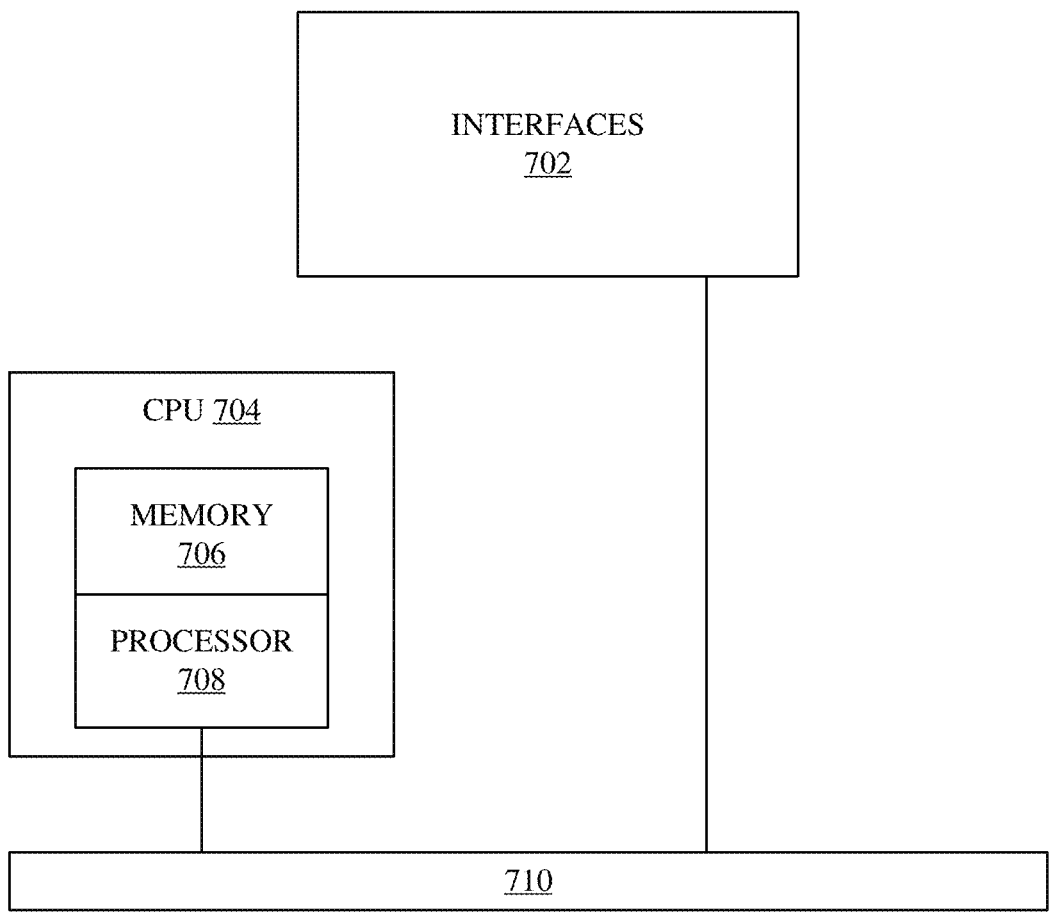
FIG. 7 illustrates an example network device.

A description of network environments and architectures for network data access and services, as illustrated in FIGS. 1A and 1B is first disclosed herein. A discussion of systems and methods for selectively assigning CBRS devices to a boost channel device group for providing network service access over dedicated channel(s) of the boost channel device group, as shown in FIGS. 2 through 5, will then follow. The discussion then concludes with a brief description of example devices, as illustrated in FIGS. 6 and 7. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

As discussed previously, the CBRS band is beginning to be adopted for commercial use in providing network services. For example, infrastructure devices and platforms are currently available for wirelessly providing network services through the CBRS band. Further, the CBRS band might be utilized in 5G deployments. A CBRS network deployment can include a set of CBRS devices under the same administrative domain. The deployment can have a common interface management policy such as a centralized or distributed self-organizing network (SON) policy that includes a group id of the set of CBRS devices. A spectrum access system can allocate available space in the CBRS band, e.g. general authorized access (GAA) spectrum space, to the CBRS devices under the same group without any channel orthogonalization. However the bandwidth of the available space in the CBRS band may not support a distribution of frequencies to increase or otherwise optimize the carrier aggregation capabilities for all of the CBRS devices.

The present includes systems, methods, and computer-readable media for solving these problems/discrepancies. Specifically, the present technology involves system, methods, and computer-readable media for dynamically assigning devices to specific channels in the Citizens Broadband Radio Services CBRS band. Additionally, the present technology involves systems, methods, and computer-readable media for dynamically assigning devices to a boost channel device group for communicating in the CBRS band over one or more dedicated channels exclusively allocated to the boost channel device group.

Figure 2:
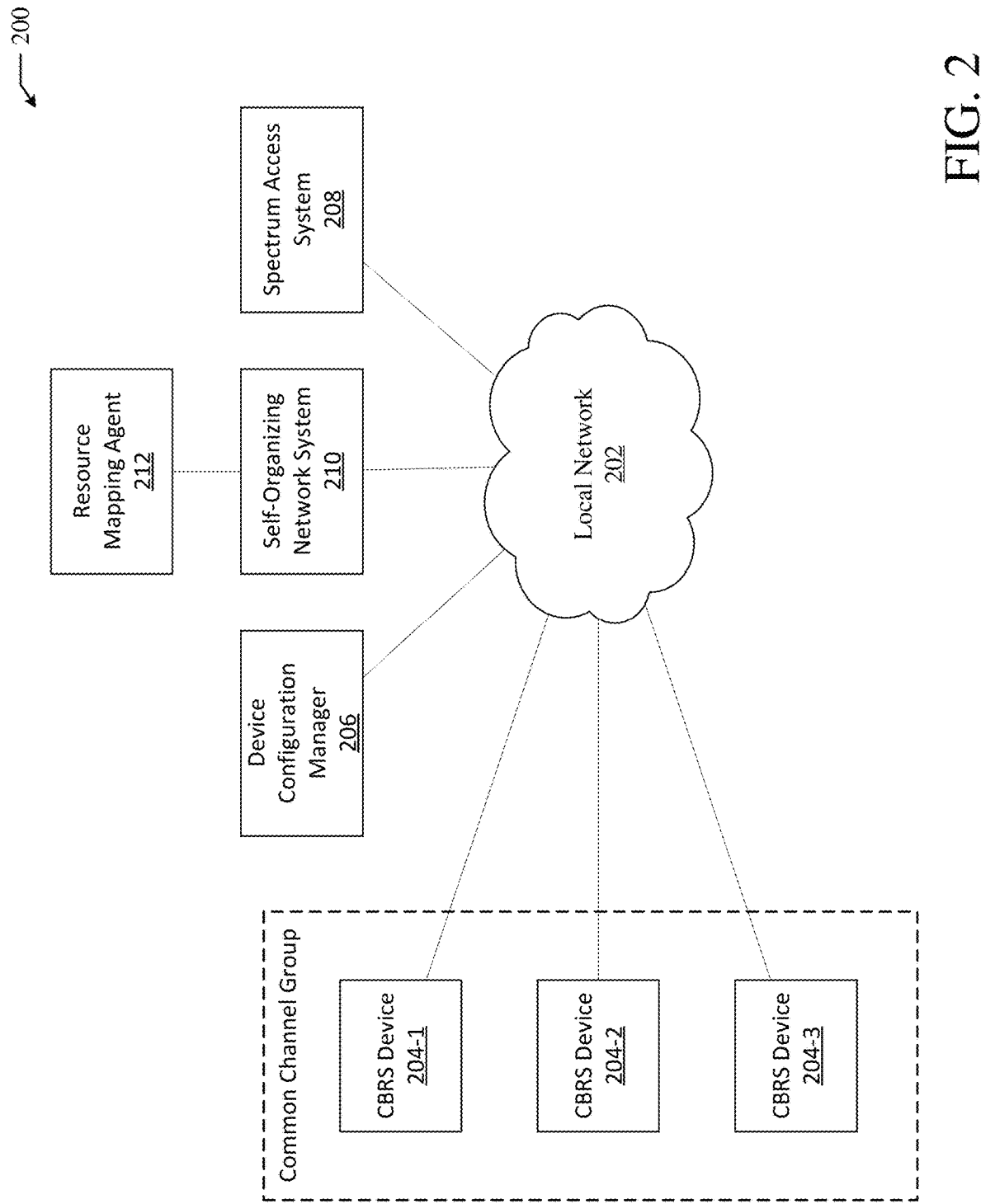
FIG. 2 illustrates an example network environment for dynamically assigning CBRS devices to specific channels in the CBRS band for providing network service access.

FIG. 2 illustrates an example network environment 200 for dynamically assigning CBRS devices to specific channels in the CBRS band for providing network service access. The example network environment 200 includes a local network 202. The local network can be formed by an applicable network environment, e.g. an IP network. For example, the local network 202 can be a local network of an Enterprise or a service provider.

The example network environment 200 includes a first CBRS device 204-1, a second CBRS device 204-2, and a third CBRS device 204-3, herein collectively referred to as (CBRS devices 204). The example network environment 200 also includes a device configuration manager 206, a spectrum access system 208, a self-organizing network system 210, and a resource mapping agent 212. One or an applicable combination of the device configuration manager 206, the spectrum access system 208, the self-organizing network system 210, and the resource mapping agent 212 can be implemented remote from the CBRS devices 204, e.g. in a cloud or fog environment. The functions of the device configuration manager 206, the spectrum access system 208, the self-organizing network system 210, and the resource mapping agent 212 in dynamically controlling the CBRS devices 204 to communicate over specific channels within the CBRS band will be discussed throughout this description.

While three CBRS devices are shown in the example network environment 200 shown in FIG. 2, the network environment 200 can include more or fewer than three CBRS devices. The CBRS devices 204 function according to an applicable device for communicating over the CBRS band to provide network service access, e.g. to clients coupled to the CBRS devices 204. For example, the CBRS devices 204 can include small cell devices, micro radio devices, and other applicable access points for providing network service access through the CBRS band.

The CBRS devices 204 can be part of the same common channel group. A common channel group, as used herein, can include a group of CBRS devices that request a common primary channel allocation. Specifically, a common channel group can be associated with a specific spectrum grant, e.g. in the CBRS band. In turn, CBRS devices in the common channel group can all be assigned to communicate within the specific spectrum grant of the common channel group.

The CBRS devices 204 can be configured to provide network service access as part of an applicable cellular network. Specifically, the CBRS devices 204 can be configured to provide network service access as part of a LTE network. In providing network service access as part of an LTE cellular network, the CBRS devices 204 can be included as part of a private LTE deployment. A private LTE deployment, as used herein, can include a local LTE network that uses dedicated radio equipment to provide service to a limited area. For example, a private LTE deployment formed through the CBRS devices 204 can include a private cellular network of an enterprise that is used to provide network service access to IoT devices associated with the enterprise.

The CBRS devices 204 can support carrier aggregation in providing network service access through the CBRS band. Carrier aggregation and the total number of component carriers can be configured individually on each of the CBRS devices 204. Specifically, and as will be discussed in greater detail later, the device configuration manager 206 can configure the CBRS devices 204 to provide network service access through the CBRS band, e.g. configure carrier aggregation and component carriers for the CBRS devices 204.

The spectrum access system 208 functions to provide spectrum band allocations to devices for providing network service access. Specifically, the spectrum access system 208 functions to allocate spectrum grants within the CBRS band to the CBRS devices 204 for providing network service access over the spectrum grants within the CBRS band. The spectrum access system 208 can be an applicable Federal Communications Commission (FCC) authorized spectrum access system for allocating spectrum grants within the CBRS band. The CBRS devices 204 can register directly with the spectrum access system 208 or through a proxy system, e.g. a domain proxy, to secure spectrum allocations in the CBRS band. In various embodiments, if a spectrum request from the CBRS devices 204 includes a common channel group identifier (CGI) of an associated channel group, then the spectrum access system 208 can grant the entire available spectrum to all of the CBRS devices 204 in the common channel group without any orthogonalization. A CGI can inform the spectrum access system 208 that local interference systems, e.g. the self-organizing network system 210, can handle the efficient deployment of the same set of channels assigned to the CBRS devices 204.

The self-organizing network system 210 functions to control operation of the CBRS devices 204 in providing network service access through the CBRS band. Specifically, the self-organizing network system 210 can perform applicable functions of a self-organizing network controller in managing operation of the CBRS devices 204 to provide network service access through the CBRS band. More specifically, the self-organizing network system 210 can perform interference management functions with respect to the CBRS devices 204, e.g. under a common interface domain. For example, the self-organizing network system 210 can locally register spectrum grants allocated to the CBRS devices 204 by the spectrum access system 208. Further and as will be discussed in greater detail later, the self-organizing network system 210 can operate with the resource mapping agent 212 to provide channel assignments to the CBRS devices 204, e.g. based on spectrum grants allocated to the CBRS devices 204. Additionally, the self-organizing network system 210 can operate with the device configuration manager 206 to dynamically change carrier aggregation configurations of the CBRS devices 204. Further, if a domain proxy is used to obtain spectrum grants from the spectrum access system 208, the self-organizing network system 210 can operate with the domain proxy to implement the spectrum grants at the CBRS devices 204.

The self-organizing network system 210 can form a boost channel device group. Specifically, the self-organizing network system 210 can select one or more dedicated channels from one or more spectrum grants allocated to the CBRS devices 204 by the spectrum access system 208. In turn, the self-organizing network system 210 can exclusively allocate the one or more dedicated channels, boost channel(s), to the boost channel device group. In exclusively allocating the one or more dedicated channels to the boost channel device group, only CBRS devices that are assigned to the boost channel device group can use the one or more dedicated channels to provide network service access. As will be discussed in greater detail later, CBRS devices can be selectively assigned to the boost channel device to communicate over the dedicated channel(s) of the boost device group. This can limit the number of devices that actually use the channel(s) dedicated to the boost device group. In turn, this can help to ensure that bandwidth is available on the channel(s) of the boost device group leading to increased throughput and improved quality of service for CBRS devices communicating over the boost device group channel(s).

Additionally, the self-organizing network system 210 can form a normal channel device group. Specifically, the self-organizing network system 210 can assign channels in the one or more spectrum grants allocated to the CBRS devices 204 to the normal device group. In turn, the CBRS devices 204 that are assigned to the normal channel device group, e.g. not assigned to the boost channel device group, can communicate over the channels, normal channels, allocated to the normal channel device group. Further, the CBRS devices 204 that are assigned to the normal channel device group can refrain from using the boost channels, thereby increasing available bandwidth in the boost channels. The channels allocated to the normal device group can include all or a portion of the channels that are not allocated to the boost channel device group. For example, the self-organizing network system 210 can allocate first and second channels, boost channels, in a spectrum grant to the boost channel device group. Further in the example, the self-organizing network system 210 can allocate the remaining channels in the spectrum grant to the normal device group. In various embodiments, each of the CBRS devices 204 can be assigned an individual channel in the normal channel device group, e.g. a normal channel. In turn, each of the CBRS devices 204 can use the normal channel assigned to it to provide network service access through the CBRS band.

The self-organizing network system 210 can selectively assign one or a combination of the CBRS devices 204 to the boost channel device group. In turn, the device configuration manager 206 can configure the CBRS devices 204 assigned to the boost channel device group to communicate over the one or more dedicated channels of the boost device group.

Specifically, the device configuration manager 206 can configured the CBRS devices 204 to provide network service access through carrier aggregation over the one or more dedicated channels of the boost device group. By selectively assigning CBRS devices to the boost channel device group, the self-organizing network system 210 can selectively control communications in the CBRS band over the dedicated channel(s) allocated to the boost channel device group. Specifically, as only CBRS devices that are assigned to the boost channel device group can communicate over the dedicated channel(s), the self-organizing network system 210 can use selective boost channel device group assignment to control which CBRS devices communicate over the dedicated channel(s).

In various embodiments, the CBRS devices 204 assigned to the boost channel device group can be configured to concurrently provide network service access over channel(s) of the normal channel device group and dedicated channel(s) of the boost channel device group. Specifically, a CBRS device assigned to the boost channel device group can simultaneously communicate over a channel allocated to the normal channel device group and a dedicated channel of the boost channel device group to provide network service access. The CBRS devices 204 can concurrently provide network service access over channel(s) of the normal channel device group and dedicated channel(s) of the boost channel device group in response to being assigned to the boost channel device group.

The self-organizing network system 210 can also function to reassign a CBRS device from the boost channel device group to the normal channel device group. Specifically, the self-organizing network system 210 can disassociate the CBRS device from the boost channel device group, effectively reassigning the CBRS device to the normal channel device group. After being reassigned from the boost channel device group to the normal channel device group, the CBRS device can refrain from communicating over the dedicate channel(s) allocated to the boost channel device group and begin or continue to communicate over the channel(s) allocated to the normal channel device group.

The self-organizing network system 210 can function with the resource mapping agent 212 to selectively assign one or a combination of the CBRS devices 204 to the boost channel device group. The resource mapping agent 212 can function to orchestrate/facilitate local channel assignment, e.g. assignment to the dedicated channel(s) of the boost channel device group, to support resource optimization of the CBRS devices 204. Specifically, the resource mapping agent 212 can function to identify one or more CBRS devices of the CBRS devices 204 that are eligible to/should be allowed to communicate over the dedicated channel(s) of the boost channel device group. As follows, the self-organizing network system 210 can assign the one or more CBRS devices that are identified by the resource mapping agent 212 to the boost channel device group.

The resource mapping agent 212 can determine whether to include a CBRS device in a boost channel device group based on characteristics of the device in providing network service access through the CBRS band. Specifically, the resource mapping agent 212 can determine whether the CBRS device is eligible for the boost channel device group based on characteristics of the CBRS device in providing network service access through normal channels allocated to the normal channel device group. Characteristics of a CBRS device in providing network service access can include applicable characteristics of the device in providing network service access through the CBRS band. For example, characteristics of a CBRS device in providing network service access can include a traffic load at the device, a number of clients accessing network services through the device, a number of the clients accessing network services through the device that qualify for one or more threshold levels of quality of service in accessing network services through the device, and characteristics of one or more applications that are accessed through the device in providing network service access through the CBRS band. For example, if a CBRS device is serving ten clients that qualify for a high quality of service, then the resource mapping agent 212 can classify the device as being eligible for the boost channel device group. In turn, the self-organizing network system 210 can assign the device to the boost channel device group to help the device in meeting the quality of service requirements of the clients.

Further, the resource mapping agent 212 can determine whether to include a CBRS device in a boost channel device group based on characteristics of a common channel group associated with the CBRS device. Specifically, the resource mapping agent can determine whether to include a CBRS device in a boost channel device group based on characteristics of other devices in a common channel group with the device that are assigned to the boost channel device group. More specifically, the resource mapping agent 212 can determine whether a CBRS device is eligible for the boost channel device group based on the total available spectrum granted to a common channel group of the device. For example, if the available spectrum, e.g. available normal channels in the normal channel device group, of a common channel group is low, then the resource mapping agent 212 can determine a CBRS device in the common channel group is eligible for assignment to the boost channel device group.

Additionally, the resource mapping agent 212 can determine whether to include a CBRS device in a boost channel device group based on time of day scheduling for the boost channel device group. Time of day scheduling for the boost channel device group can specify a time for allowing a specific CBRS device to utilize the dedicated channel(s) of the boost channel device group. Further, time of day scheduling for the boost channel device group can specify a duration for allowing a specific CBRS device to utilize the dedicated channel(s) of the boost channel device group. For example, time of day scheduling can specify the first CBRS device 204-1 can utilize the dedicated channel(s) of the boost channel device group for two hours in the afternoon. In turn, the resource mapping agent 212 can determine the first CBRS device 204-1 is eligible for the boost channel device group for two hours in the afternoon based on the time of day scheduling for the boost channel device group. Further, the resource mapping agent 212 can recommend downgrading the first CBRS device 204-1 from the boost channel device group, e.g. disassociating the first CBRS device 204-1 from the boost channel device group, after the two hours have expired.

The resource mapping agent 212 can gather information used to determine whether a CBRS device is eligible for the boost channel device group from an applicable information source. Specifically, the resource mapping agent 212 can gather information related to characteristics of CBRS devices in providing network service access from either or both the CBRS devices themselves and a domain proxy. For example, the resource mapping agent 212 can gather information indicating a traffic load at a CBRS device from the CBRS device itself. Additionally, the resource mapping agent 212 can gather application flow visibility data from an application visibility and control system. The applicable flow visibility data can subsequently be used to determine whether a CBRS device should be assigned to the boost channel device group. Further, the resource mapping agent 212 can gather channel boost eligibility information on a per-location basis from a policy server. In turn, the channel boost eligibility information can be used to determine whether a CBRS device should be assigned to the boost channel device group. The channel boost eligibility information can indicate a number of devices that can actually be assigned to the boost channel device group at a specific site. The number of devices that are eligible for assignment to the boost channel device group can vary over time for a specific site.

Figure 3:
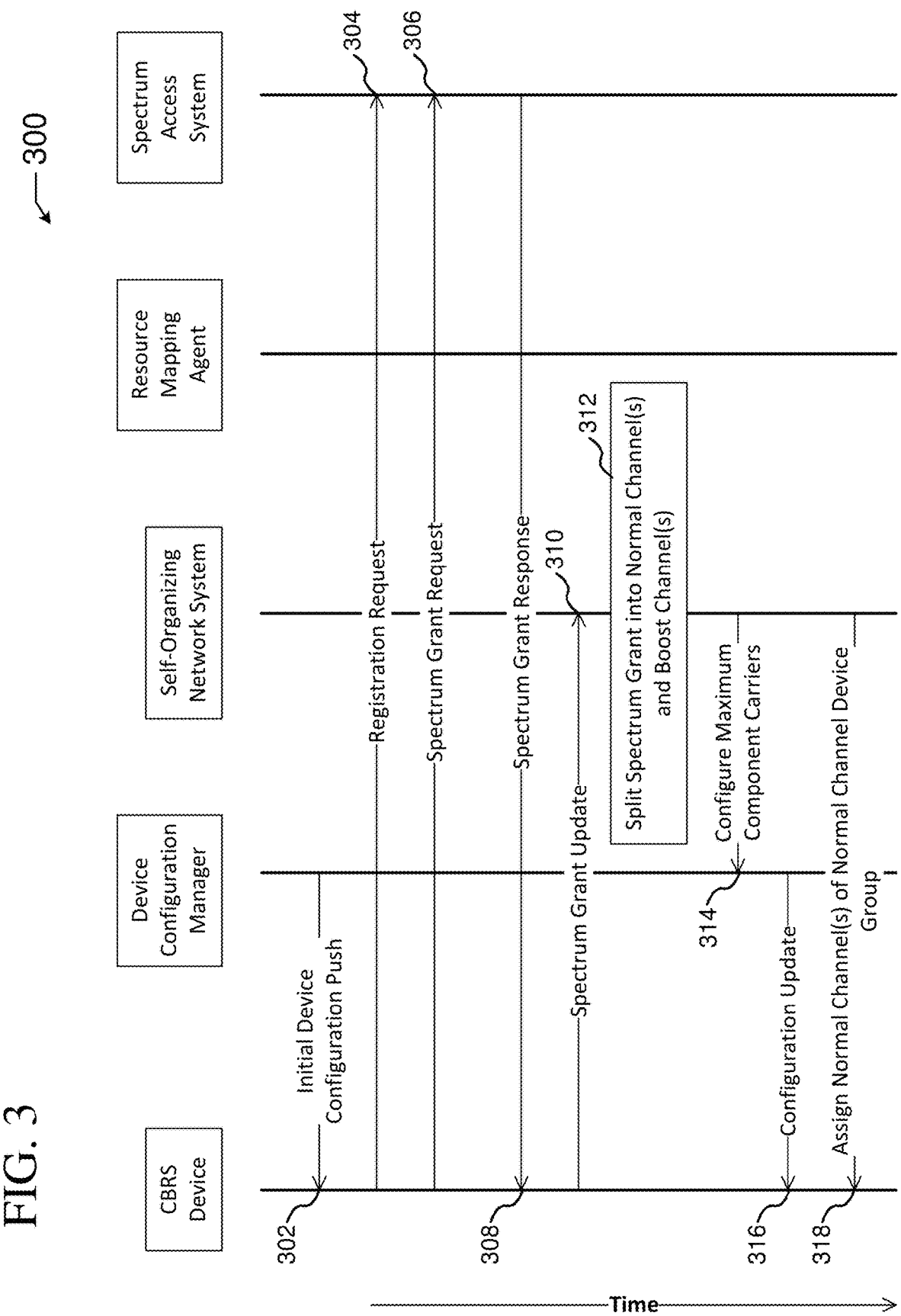
FIG. 3 illustrates a timing diagram for configuring a CBRS device to operate in a normal channel device group in the CBRS band.

FIG. 3 illustrates a timing diagram 300 for configuring a CBRS device to operate in a normal channel device group in the CBRS band. In the example timing diagram 300 shown in FIG. 3, at step 302, the device configuration manager pushes an initial device configuration push to the CBRS device. The initial device push can include a common channel group identification of a common channel group that is associated with the CBRS device. At step 304, the CBRS device sends a registration request to the spectrum access system. The registration request can include the common channel group identification associated with the CBRS device. Further, the registration request can also include location information of the CBRS device. At step 306, the CBRS device sends a spectrum grant request to the spectrum access system. The spectrum grant request can be a request for spectrum space in the CBRS band.

At step 308, the spectrum access system sends a spectrum grant response back to the CBRS device. The spectrum grant response can include a grant of available CBRS spectrum space associated with the common channel group of the CBRS device. Specifically, the spectrum access system can grant a portion of the CBRS band to the common channel group of the CBRS device and correspondingly to the CBRS device itself. At step 310, the CBRS device sends a spectrum grant update to the self-organizing network system. The spectrum grant update can indicate the available CBRS spectrum space that is granted to the common channel group associated with the CBRS device.

The self-organizing network system can use the spectrum grant update to split the granted spectrum into normal component channels and boost component channels at step 312. Specifically, the self-organizing network system can assign dedicated channels in the granted spectrum to the boost channel device group and the remaining channels to the normal channel device group. The self-organizing network system can register the dedicated channels allocated to the boost channel device group with the resource mapping agent. Further, the self-organizing network system can register the channels allocated to the normal channel device group with the resource mapping agent.

At step 314, the self-organizing network system configures maximum component carriers for the CBRS device on the device configuration manager. Specifically, the self-organizing network system can configure maximum component carriers, on the device configuration manager, for the CBRS device operating in the normal channel device group. At step 316, the device configuration manager configures the CBRS device to communicate through channels allocated to the normal channel device group. At step 318 the self-organizing system assigns the CBRS device to one or more specific channels in the normal channel device group. In turn, the CBRS device can communicate over the one or more specific channels in the normal channel device group that are assigned to the CBRS device.

Figure 4:
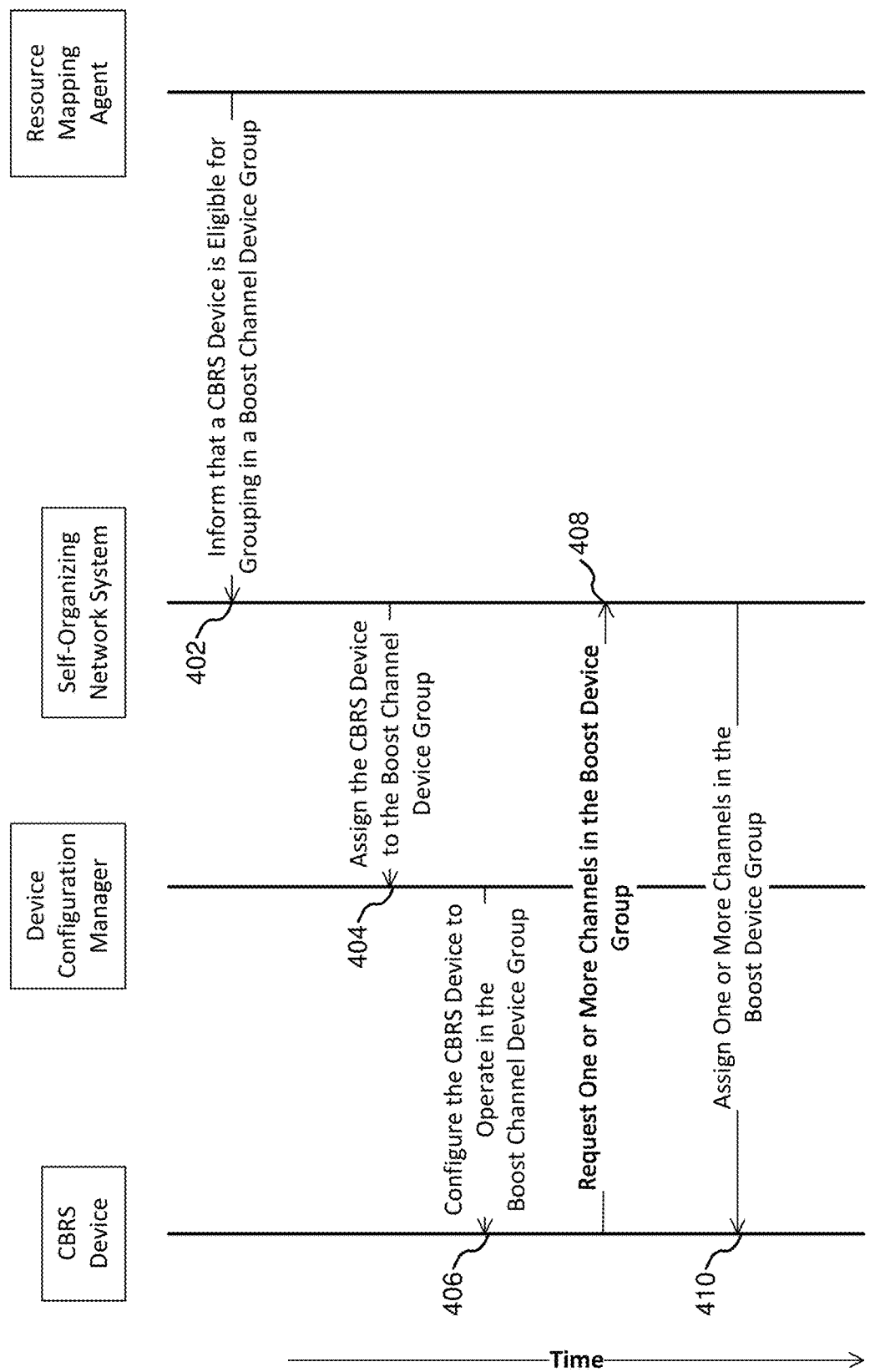
FIG. 4 illustrates a timing diagram for configuring a CBRS device to operate in a boost channel device group in the CBRS band.

FIG. 4 illustrates a timing diagram 400 for configuring a CBRS device to operate in a boost channel device group in the CBRS band. In the example timing diagram 400 shown in FIG. 4, at step 402, the resource mapping agent informs the self-organizing network system that a CBRS device is eligible for inclusion in the boost channel device group. The resource mapping agent can determine that the CBRS device is eligible for inclusion in the boost channel device group using the techniques described herein. For example, the resource mapping agent can determine that the CBRS device is eligible for the boost channel device group using the boost channel scoring technique described later.

At step 404, the self-organizing network system assigns the CBRS device to the boost channel device group. Specifically, the self-organizing network system can assign the CBRS device to the boost channel device group based on the recommendation to assign the CBRS device to the boost channel device group received from the resource mapping agent at step 402. At step 406, the device configuration manager configures the CBRS device to operate in the boost channel device group. At step 408, the CBRS device sends a request for one or more dedicated channels in the boost channel device group to the self-organizing network system. At step 410, the self-organizing network system assigns one or more dedicated channels in the boost channel device group to the CBRS device. In turn, the CBRS device can communicate over the one or more dedicated channels assigned to it by the self-organizing network system.

Figure 5:
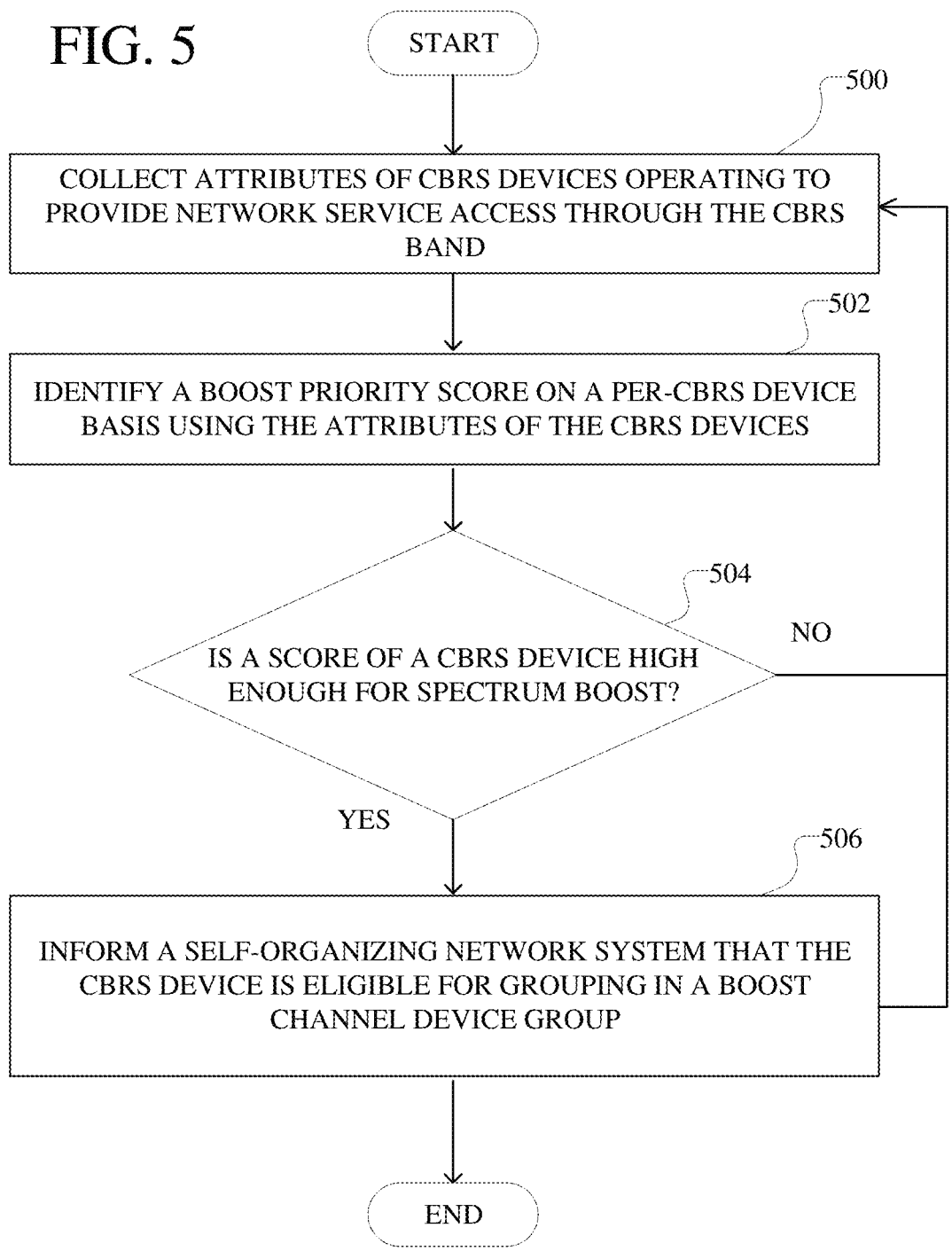
FIG. 5 illustrates a flowchart for an example method of determining CBRS device eligibility for assignment to a boost channel device group operating in the CBRS band based on a boost priority score.

FIG. 5 illustrates a flowchart for an example method of determining CBRS device eligibility for assignment to a boost channel device group operating in the CBRS band based on a boost priority score. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated.

Each module shown in FIG. 5 represents one or more steps, processes, methods or routines in the method. For the sake of clarity and explanation purposes, the modules in FIG. 5 are described with reference to the environment 200 shown in FIG. 2.

At step 500, the resource mapping agent 212 collects attributes of CBRS devices operating to provide network service access through the CBRS band. As discussed previously, the resource mapping agent 212 can collect the attributes of the CBRS devices from an applicable source, e.g. the CBRS devices themselves, a domain proxy, an application visibility and control system, and a policy server. As discussed previously, the attributes of the CBRS devices can include applicable attributes of the CBRS devices operating to provide network service access through the CBRS band. For example, the attributes of the CBRS devices can include characteristics of each of the CBRS devices operating to provide network service access, characteristics of a common channel group associated with the CBRS devices, time of day scheduling for the boost channel device group, and channel boost eligibility information, e.g. on a per-location basis.

At step 502, the resource mapping agent 212 identifies a boost priority score on a per-CBRS device basis using the attributes of the CBRS devices. A boost priority score can be a value, e.g. a numerical value, on a scale indicating whether a CBRS device should be assigned to, or otherwise qualifies for assignment to, the boost channel device group. For example, if a first CBRS device is assigned a higher boost priority score than a second CBRS device, then the first CBRS device has greater priority than the second CBRS device for being assigned to the boost channel device group. In using the attributes of the CBRS devices to identify boost priority scores for the CBRS devices, the resource mapping agent 212 can apply varying weights to each attribute of the CBRS devices to identify the boost priority scores.

At decision point 504, the resource mapping agent 212 determines whether a boost priority score of a CBRS device qualifies the CBRS device for assignment to the boost channel device group. Specifically, the resource mapping agent 212 can determine the position of the boost priority score of the CBRS device relative to a threshold boost priority score qualifies the CBRS device for assignment to the boost channel device group. For example, if the boost priority score of the CBRS device is above a threshold boost priority score, then the resource mapping agent 212 can determine that the CBRS device is eligible for assignment to the boost channel device group. A threshold boost priority score for assigning the CBRS devices to the boost channel device group can vary. For example, the threshold boost priority score can vary based on the number of devices that can actually be assigned to the boost channel device group, e.g. based on availability of the dedicated channels of the boost channel device group.

If the resource mapping agent 212 determines that the CBRS device qualifies for assignment to the boost channel device group, then at step 506, the resource mapping agent 212 can inform the self-organizing network system 210 that the CBRS device is qualified for assignment to the boost channel device group. In turn, the self-organizing network system 210 can then assign the CBRS device group to the boost channel device group and facilitate the CBRS device's access to the dedicated channel(s) of the boost channel device group. Regardless of whether the resource mapping agent 212 determines that the CBRS device qualifies for the boost channel device group or fails to qualify for the boost channel device group, the flowchart can return back to step 500. Specifically, the resource mapping agent 212 can continue to monitor the CBRS devices and determine whether the CBRS devices qualify for assignment to the boost channel device group.

The disclosure now turns to FIGS. 6 and 7, which illustrate example network devices and computing devices, such as switches, routers, load balancers, client devices, and so forth.

FIG. 6 illustrates a computing system architecture 600 wherein the components of the system are in electrical communication with each other using a connection 605, such as a bus. Exemplary system 600 includes a processing unit (CPU or processor) 610 and a system connection 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

FIG. 7 illustrates an example network device 700 suitable for performing switching, routing, load balancing, and other networking operations. Network device 700 includes a central processing unit (CPU) 704, interfaces 702, and a bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 704 to efficiently perform routing computations, network diagnostics, security functions, etc.

Although the system shown in FIG. 7 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the bus 710, to exchange data and signals and coordinate various types of operations by the network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   selecting one or more dedicated channels within a Citizens Broadband Radio Services (CBRS) band;
   forming a boost channel device group by exclusively allocating the one or more dedicated channels to the boost channel device group, the boost channel device group associated with the one or more channels for a plurality of devices to access a network through the CBRS band;
   forming a normal channel device group by allocating, to the normal channel device group, one or more channels in the CBRS band that are separate from the one or more dedicated channels allocated to the boost channel device group; and
   selectively assigning one or more devices communicating in the CBRS band to one of the boost channel device group and the normal channel device group based on characteristics of the one or more devices in accessing the network through the CBRS band to selectively control communications in the CBRS band over the one or more dedicated channels utilized by the boost channel device group, the selective assigning comprising:
      identifying a device of the one or more devices communicating in the CBRS band;
      assigning the device to the boost channel device group, wherein the device is configured to communicate in the CBRS band over the one or more dedicated channels allocated to the boost channel device group in response to assignment of the device to the boost channel device group; and assigning the device from the boost channel device group to the normal channel device group after the device is assigned to the boost channel device group, wherein the device is configured to communicate in the CBRS band over the one or more dedicated channels allocated to the boost channel device group in response to assignment of the device to the boost channel device group.

2. The method of claim 1, wherein the one or more devices communicating in the CBRS band include Long-Term Evolution (LTE) small cell access points that provide network service access through the CBRS band.

3. The method of claim 1, wherein the one or more devices communicating in the CBRS band include a plurality of devices in a common channel group.

4. The method of claim 1, wherein the device is assigned to the boost channel device group based on characteristics of the device in providing network service access through the CBRS band.

5. The method of claim 4, wherein the characteristics of the device in providing network service access include one or a combination of a traffic load at the device, a number of clients accessing network services through the device, and a number of the clients accessing network services through the device that qualify for one or more threshold levels of quality of service in accessing network services through the device.

6. The method of claim 1, wherein the device is assigned to the boost channel device group based on characteristics of one or more applications that are accessed through the device in providing network service access through the CBRS band.

7. The method of claim 1, wherein the device is assigned to the boost channel device group based on characteristics of other devices in a common channel group with the device that are assigned to the boost channel device group.

8. The method of claim 1, wherein the device is assigned to the boost channel device group based on time of day scheduling for the boost channel device group.

9. The method of claim 1, wherein the device is configured to concurrently provide network service access through both the one or more dedicated channels allocated to the boost channel device group and the one or more channels allocated to the normal channel device group in response to assignment of the device to the boost channel device group.

10. The method of claim 9, wherein the device is configured to provide network service access through one channel of the one or more dedicated channels allocated to the boost channel device group and one channel of the one or more channels allocated to the normal device group in response to assignment of the device to the boost channel device group.

11. The method of claim 1, wherein the device is configured to provide network service access through carrier aggregation over the one or more dedicated channels allocated to the boost channel device group.

12. The method of claim 1, wherein the one or more channels in the CBRS band allocated to the normal channel device group include all channels in the CBRS band that are not allocated to the boost channel device group as part of the one or more dedicated channels allocated to the boost channel device group.

13. A system comprising:
one or more processors; and
at least one computer-readable storage medium having stored therein instructions which, when executed by the one or more processors, cause the one or more processors to perform operations comprising:
selecting one or more dedicated channels within a Citizens Broadband Radio Services (CBRS) band;
forming a boost channel device group by exclusively allocating the one or more dedicated channels to the boost channel device group, the boost channel device group associated with the one or more dedicated channels for a plurality of devices to access a network through the CBRS band;
forming a normal channel device group by allocating, to the normal channel device group, one or more channels in the CBRS band that are separate from the one or more dedicated channels allocated to the boost channel device group; and
selectively assigning one or more devices communicating in the CBRS band to one of the boost channel device group and the normal channel device group based on characteristics of the one or more devices in accessing the network through the CBRS band to selectively control communications in the CBRS band over the one or more dedicated channels, the selectively assigning comprising:
identifying a device of the one or more devices communicating in the CBRS band;
assigning the device to the boost channel device group, wherein the device is configured to communicate in the CBRS band over the one or more dedicated channels allocated to the boost channel device group in response to assignment of the device to the boost channel device group; and
assigning the device from the boost channel device group to the normal channel device group after the device is assigned to the boost channel device group, wherein the device is configured to communicate in the CBRS band over the one or more dedicated channels allocated to the boost channel device group in response to assignment of the device to the boost channel device group.

14. The system of claim 13, wherein the device is assigned to the boost channel device group based on one or a combination of a traffic load at the device in providing network service access through the CBRS band, a number of clients accessing network services through the device, and a number of the clients accessing network services through the device that qualify for one or more threshold levels of quality of service in accessing network services through the device.

15. The system of claim 13, wherein the device is assigned to the boost channel device group based on one or a combination of characteristics of one or more applications that are accessed through the device in providing network service access through the CBRS band, characteristics of other devices in a common channel group with the device that are assigned to the boost channel device group, and time of day scheduling for the boost channel device group.

16. The system of claim 13, wherein the one or more devices communicating in the CBRS band include Long-Term Evolution (LTE) small cell access points that provide network service access through the CBRS band.

17. The system of claim 13, wherein the one or more devices communicating in the CBRS band include a plurality of devices in a common channel group.

18. The system of claim 13, wherein the one or more channels in the CBRS band allocated to the normal channel device group include all channels in the CBRS band that are not allocated to the boost channel device group.

19. The system of claim 13, wherein the device is configured to provide network service access through carrier aggregation over the one or more dedicated channels allocated to the boost channel device group.

20. A non-transitory computer-readable storage medium having stored therein instructions which, when executed by a processor, cause the processor to perform operations comprising:

selecting one or more dedicated channels within a Citizens Broadband Radio Services (CBRS) band;

forming a boost channel device group by exclusively allocating the one or more dedicated channels to the boost channel device group, the boost channel device group associated with the one or more dedicated channels for a plurality of devices to access a network through the CBRS band;

forming a normal channel device group by allocating, to the normal channel device group, one or more channels in the CBRS band that are separate from the one or more dedicated channels allocated to the boost channel device group; and selectively assigning one or more devices communicating in the CBRS band to one of the boost channel device group and the normal channel device group based on characteristics of the one or more devices in accessing the network through the CBRS band to selectively control communications in the CBRS band over the one or more dedicated channels utilized by the boost channel device group, the selective assigning comprising:

identifying a device of the one or more devices communicating in the CBRS band;

assigning the device to the boost channel device group, wherein the device is configured to communicate in the CBRS band over the one or more dedicated channels allocated to the boost channel device group in response to assignment of the device to the boost channel device group; and assigning the device from the boost channel device group to the normal channel device group after the device is assigned to the boost channel device group, wherein the device is configured to communicate in the CBRS band over the one or more dedicated channels allocated to the boost channel device group in response to assignment of the device to the boost channel device group.

\* \* \* \* \*